United States Patent [19]

Forman

[11] 4,188,266
[45] Feb. 12, 1980

[54] METHOD AND APPARATUS FOR CHANGING THE CONCENTRATION OF MOLECULES OR ATOMS

[76] Inventor: Richard A. Forman, 5007 Butternut Dr., Rockville, Md. 20853

[21] Appl. No.: 895,404

[22] Filed: Apr. 11, 1978

[51] Int. Cl.² .......................... C25C 5/04; C25C 1/22
[52] U.S. Cl. ..................................... 204/1 R; 204/1.5; 204/194
[58] Field of Search ................ 204/1 R, 1.5, 194, 244, 204/292

[56] References Cited
U.S. PATENT DOCUMENTS 4,129,481  12/1978  Aubert et al. ..................... 204/1.5

FOREIGN PATENT DOCUMENTS 1403198  5/1965  France ........................ 204/1.5

Primary Examiner—Leland A. Sebastian
Attorney, Agent, or Firm—Pollock, Vande Sande and Priddy

[57] ABSTRACT

A method for changing the concentration of a preselected atom or molecule in a mixture containing the preselected atom or molecule and atoms or molecules having mass different from the preselected one which employs a solid electrolyte which preferentially conducts the preselected atom or molecule in ionic form at a rate different from that of the other atoms or molecules in ionic form in the mixture; and apparatus suitable for carrying out the process are provided.

12 Claims, 1 Drawing Figure

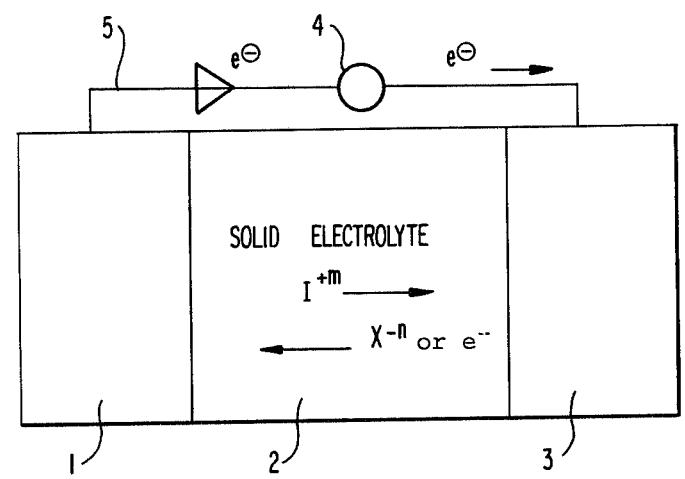

METHOD AND APPARATUS FOR CHANGING THE CONCENTRATION OF MOLECULES OR ATOMS

BACKGROUND OF THE INVENTION

The present invention is concerned with a method and apparatus for the separation, depletion, or enrichment of atoms or molecules, and is particularly concerned with the separation, depletion, or enrichment of a preselected atom or molecule from a mixture containing the preselected atom or molecule and at least one other or molecule having different mass, by transport through a solid electrolyte.

Various methods have been previously suggested for separating and enriching molecules such as isotopes of the same element. Included in such prior suggested methods are several physical processes such as gas diffusion and centrifical separation. These physical methods; however, require extremely large equipment along with a large capital outlay which in turn renders the products very expensive.

In addition, certain chemical methods for separating molecules have been suggested. For instance, A. K. Brewer et al in *J. Research Nat. Bur. Standards,* 38, 137 (1947) and S. L. Mardrosky et al, IBID, 38, 185 (1947) suggested separation by electromigration in aqueous solution. However, these electromigration methods were not very efficient since the migration of the isotopic ions was disturbed by the migration of counter ions traveling in the opposite direction. In addition, the effect of separation obtained by difference in masses of the isotopes is reduced because of hydration of the ions during migration. Therefore, separation and enrichment of isotopes on a commercial basis has not been feasible with such methods.

In order to overcome the problem of hydration of ions during such migration, A. Klem et al, *Zeitschrift Fur Naturforschung* 16a, 685 (1961) suggested the use of fused salts for the separation and enrichment of ions. However, this method suffered from the disadvantage that very high temperatures are needed to maintain salt in the fused state.

Still a further suggested method involved a use of ion exchange granular resins. In such method, the ions to be separated are absorbed by the resins from a liquid through an ion exchange reaction and thereafter migrate in the resin by virtue of the potential applied thereto. Such methods, however, proved to be very inefficient and not very practical.

Moreover, an electromigration separation method has been suggested which employs a membrane of regenerated cellulose or collodion (for instance, see U.S. Pat. No. 2,989,457). Such a proposed method, however, suffers from the disadvantage that the regenerated cellulose and collodion do not possess the characteristics for transmitting only cations selectively, and counter-ions also migrate through the membrane. Moreover, these membranes are not very resistant to various chemicals with whch they must come in contact with during use.

A still further suggested method for separating molecules is the use of two separate solutions while employing an ion exchange resin material as suggested by Seko et al in U.S. Pat. No. 3,425,924. However, this method suffers from a number of disadvantages including the necessity to use a plurality of solutions of different ions and thereby contributing to the complexity of the process. Another disadvantage of such an ion exchange method is its primary dependence upon the surface properties of the resin. Although some improvement in volume utilization can be achieved by using relatively small resin grains, the separation depends upon a surface effect rather than a volume effect. Accordingly, scaling up of the process to a large size is much less efficient than when a volume effect is utilized as in the present invention.

Accordingly, continuing work is being done to provide improved methods for separation, depletion, and/or enrichment of atoms and molecules and particularly isotopes of the same element, which processes can be used on a large commercial scale. An object of the present invention is to provide a method which enables the concentration of preselected atoms or molecules to be changed (e.g.-enrichment, depletion, or separation) quasi-continuously and economically within a commercial scale operation. Another object of the present invention is to provide a method which is sufficiently versatile so as to be applicable to all kinds of elements except possibly the rare gas elements which are difficult to prepare as ions. A further object of the present invention is to provide a process which is suitable for separating molecules or isotopes of an element in ionic form which differ from each other only slightly in mass.

A further object of the present invention is to provide a process for the enrichment or depletion of molecules which is efficient, and particularly, more efficient than, for instance, the prior liquid electrolysis processes. A further object of the present invention is to provide a process which does not require excessive amounts of energy to effect the desired enrichment.

A further object of the present invention is to provide a process which does not require the expenditure of large amounts of money nor complex and large equipment.

SUMMARY OF THE INVENTION

The process aspect of the present invention is concerned with a method for changing the concentration of a preselected atom or molecule in a mixture containing said atom or molecule and at least one other atom or molecule having mass different from said preselected atom or molecule which comprises:

(A) providing a first electrode containing said mixture;

(B) providing a solid electrolyte which preferentially conducts the preselected atom or molecule in ionic form at a rate different from that of the other atom(s) or molecule(s) in said mixture;

(C) providing a second electrode of material having an electronegativity different from that of said preselected atom or molecule;

(D) placing said first and second electrodes on opposite sides of said solid electrolyte in electrically conducting relationship therewith;

(E) connecting said first and second electrodes with an electrical conductor to provide for the assembly of electrodes and the solid electrolyte to pass current whereby the preselected atoms or molecules move in ionic form through the solid electrolyte at a rate different from that of the other atom(s) or molecule(s) in the mixture;

(F) terminating the current when the concentration of the preselected atom or molecule at the first or second electrode has reached a predetermined level different from its concentration in the mixture; and (G) removing from the region of the said first or second electrode or said electrolyte, material having said predetermined level of concentration of said preselected atom or molecule.

The apparatus aspect of the present invention is directed to apparatus for changing the concentration of a preselected atom or molecule in a mixture containing said atom or molecule and at least one other atom or molecule having mass different from said preselected atom or molecule which comprises:

(A) a first electrode of material containing said mixture in an amount greater than that normally used in a solid electrolyte battery and sufficient to permit a change in the concentration of said preselected atom or molecule;

(B) a second electrode of a material having electronegativity different from that of the preselected atom or molecule;

(C) a solid electrolyte which preferentially conducts the preselected atom or molecule at a rate different from that of the other atom(s) or molecule(s) in said mixture and sufficiently large to provide for the predetermined level of concentration of said preselected atom or molecule;

(D) said solid electrolyte being in electrical contact with and between said first and second electrodes; and (E) an electrical path interconnecting said first and second electrodes.

BRIEF DESCRIPTION OF THE DRAWINGS

FIG. 1 is a schematic diagram showing an apparatus suitable for carrying out the process of the present invention. The letters m and n in the FIGURE represent the valency of the ions.

DESCRIPTION OF PREFERRED EMBODIMENTS

The present invention is suitable for changing the concentration of atoms or molecules which differ in mass and is applicable to all kinds of elements except possibly for the rare gas elements which are difficult to prepare as ions. In particular, the present invention finds its greatest use in the separation and/or enrichment or depletion of an isotope of an element from another isotope of the same element which differs in its mass. The present invention is applicable to separations and/or enrichments and/or depletions wherein the difference in the mass is only slight.

Examples of some particular elements whose isotopes can be separated by the process of the present invention include the alkali metals such as lithium, sodium, potassium, rubidium, and cesium; the alkaline earth metals such as magnesium, strontium, and barium,; group VII elements such as hydrogen, fluorine, and manganese; group IB elements such as copper and silver; group II elements such as mercury; group IV elements such as lead; group III elements such as thallium; group VI elements such as oxygen; actinides such as uranium, and lanthanides such as Europium.

The electrode which includes the molecule to be separated and/or enriched and/or depleted can be either the cathode or anode of the system depending on the electronegativity of the other electrode. The electrode which includes the molecule to be separated and/or enriched and/or depleted is preferably larger than the corresponding electrode would be in a battery. In fact, it preferably should be at least about twice as large as a corresponding electrode in a battery.

It is preferred that the electrode which contains the desired molecule be present in excess since if the entire electrode were consumed during operation, the final electrochemical reaction product would contain all the material with which the process was started and hence no separation would be obtained. Although less desirable, it is possible to use an electrode which would be the same size as one in a battery and even smaller if the process were only operated for a short time (e.g.-not long enough to consume the electrode). However, such use of an electrode not having an excess of material is not as efficient as the use of an electrode according to the preferred aspect of the present invention.

The electrode containing the desired molecule or atom to be separated and/or enriched or depleted can be the element per se or can be a mixture of the element and a suitable electrode material such as previously used in solid electrolytic batteries such as graphite or other material which does not adversely affect the desired change in concentration. It can be liquid, or solid, or gaseous.

The other electrode employed in the present invention must have an electronegativity which is different from that of the electrode which contains the molecule or atom which is to be separated and/or enriched or depleted. If the electrode includes the material which would operate to accept an electron it would be the anode, whereas the electrode containing the molecule or atom which is to be separated and/or enriched or depleted would be the cathode of the system.

Examples of some suitable anodes when a metal is the material to be separated and/or enriched or depleted include metallic halides such as the alkali halides and sulfur.

The other electrode to which the ions migrate can be of a size relative to the first electrode which is substantially the same as the size of a corresponding electrode in a solid electrolytic battery.

The solid electrolyte employed according to the present invention is selected so that it will preferentially conduct the preselected molecule or atom in ionic form therethrough at a rate different from the rate of the other molecule(s) or atom(s) present in the electrode in ionic form. The selection of a particular electrolyte will depend primarily upon the ionic size and/or mass of the desired molecule or atom and its valence. The separation according to the present invention operates whereby the solid state electrolyte is selected so that is permits the preselected atom or molecule to move or be transported therethrough in ionic form at a rate different from the rate of the other atom(s) or molecule(s) present in the electrode in ionic form. The rate of transport of the preselected molecule in ionic form under the presence of the cell electrochemical potential depends upon the mass and ionic size of the ion so that for ions of different mass and particularly isotopes, different quantities will be transported in any particular interval of time. Reference can be made to the extensive literature which provides information as to which particular electrolytes already have been employed in other applications and particularly in solid state batteries whereby certain molecules or atoms are transported through the electrolyte in operation of the batteries. However, such a process is quite different from that of the present invention in that the battery is operated such that there is no enrichment or depletion obtained.

Many solid electrolyte materials are already known and as known include those solids which have a defect or vacancy or interstitial structure. In other words, these structures either have ions where they are not normally present (a doped material) or have voids where an ion should be. Discussions of the solid electrolytes can be found, for instance, in "Fast Ion Transport in Solids-Solid State Batteries and Devices", W. Van-Gool, North Holland Publishing Company, 1973, page 645 et seq., and *Journal of Materials Science* 12 (1977) "Review Fast Ion Conduction Material", McGeehin, pp. 1–27, disclosures of which are incorporated herein by reference.

Since the movement of the atom or molecule according to the present invention is due to its ionic size and valence, it is expected that ions of similar size and valence would behave similarly in the same electrolyte. Therefore, once an electrolyte is selected for a particular element in a column of the periodic table, it is expected that all the other ions of that particular series would act similarly in the electrolyte or in closely related electrolytes.

It is of course recognized that the electrolyte should not be such as to permit the preselected atom or molecule in ionic form to diffuse easily in the reverse direction during operation. Also the electrode and electrolyte should not be chosen so that counterions flow in the opposite direction thereby preventing the desired atom or molecule in ionic form from moving through the electrolyte. This is not usually a problem since anions and cations are vastly different in ionic size.

Examples of some specific solid electrolytes which are suitable in the present invention include $\beta$-alumina and $\beta$-gallia and particularly for use in separating isotopes of such metals such as lithium, sodium, potassium, rubidium, cesium, europium, uranium, silver, and manganese.

The present invention can be further explained by reference to FIG. 1 wherein for the sake of simplicity in explanation, the cathode 1 is considered to be sodium, the solid electrolyte 2 is considered to be $\beta$-alumina ($Na_2O.11Al_2O_3$) and the anode 3 is liquid sulfur. For instance, consider the cathode to be composed of $^{23}Na$ and $^{24}Na$. In nature $^{23}Na$ is the predominant isotope of nearly 100% abundance, but $^{24}Na$ is a reasonably long lived radioactive isotope of potential medical importance. In the operation of such a process, when the switch 4 is closed connecting the anode and cathode, electrons will flow through conductor 5 from the anode to the cathode, and sodium ions will migrate towards the anode whereby the reaction of $2Na^+ + S^{=} = Na_2S$ will occur. The solid electrolyte permits $^{23}Na^+$ to migrate through at a faster rate than $^{24}Na^+$. The reactions can be shown as follows:

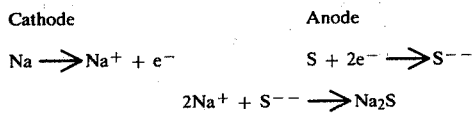

| Cathode | Anode |
|---|---|
| $Na \rightarrow Na^+ + e^-$ | $S + 2e^- \rightarrow S^{--}$ |
| | $2Na^+ + S^{--} \rightarrow Na_2S$ |

The electrical path connecting the anodes may contain, if desired, energy storage (e.g., capacitor) or other means of utilizing the electrical energy produced during operation of the process and/or may include means for controlling the rate of flow thereof.

Examples of other suitable electrolytes include zirconia, silver halides, copper halides, ternary silver and copper halides, binary and ternary fluorides, transition metal oxides with tunnel structures, ceria, potassium hydrogen difluoride, various compounds with oxyanions in bcc and in fcc arrangements (e.g., sulfates, phosphates, and tungstates).

For the separation and/or enrichment of a lead isotope, a preferred electrolyte is $PbO_2$. A preferred electrolyte for the separation of a fluoride isotope is $PbF_2$.

Exemplary of still some further specific solid electrolytes along with selected cathode and anode materials are set forth below:

Cathodes/Electrolyte/Anode

Ag/AgBr/Ag—Au
Ag/AgBr/C
Ag/AgBr/Pt
Ag/AgI/Ag
Ag/AgI/$Ag_{2+x}S$
Ag/AgI/C
Ag/AgI/$I_2$
AgI,$Ag_3SI$,S/AgI/AgI,$I_2$
Ag,Pt/AgI/$Ag_2X$,Pt (X=Se or Te)
Ag,Pt/AgI/$Ag_{2+x}S$/S
Ag/AgI—$CdI_2$/C,$RbI_3$
C,$I_2$/AgI/$KAg_4I_5$/$KAg_4I_5$,$K_2AgI_3$/$I_2C$,
Ag/$Ag_3SI$/$I_2$
S,$Ag_2S$/$Ag_3SI$/$Ag_3SI$,AgI,S
Ag/$K_2$/$AgI_3$,$KAg_4I_5$/$I_2$
Ag/$RbAg_4I_5$/$RbI_3$
Ag/$RbAg_4I_5$/$RbAg_4I_5$,$I_2$,Pt
Ag/$KAg(CN)_2$,KI,KCN.4AgI/$I_2$
Na/$\beta$-$Al_2O_3$/$Br_2$
Na/$\beta$-$Al_2O_3$/$Cl_2$
Na/$\beta$-$Al_2O_3$/S
Na/$\beta$-$Al_2O_3$/$C_8CrO_3$
Na/$\beta$-$Al_2O_3$/$Na_{0.6}WO_3$
Na/$\beta$-$Al_2O_3$/$Na_2O.11FeAlO_3$
Na/$\beta$-$Al_2O_3$/$Na_2O.11Fe_{0.95}Ti_{0.05}AlO_3$
Na—Hg/$\beta$-$Al_2O_3$/Na—Hg
Cu/CuCl/Cu-Au
Cu/CuCl/C Li/LiI/AgI
Li/LiI/CuI
Li/LiI/$PbI_2$
Pt/$Li_2SO_4$/Zn
$O_2$,Pt/$ZrO_2$—CaO/$N_2$—$O_2$,Pt
air, Pt/$ZrO_2$—CaO/Fe(liquid)
M,MO/$ZrO_2$—CaO/M,MO (M=Cu,Fe,Ni; MO=metal oxide which could be $Fe_2O_3$)
$Cu_2O$/$ZrO_2$—CaO/Pt
Pt,$Fe_2O_3$-/$ZrO_2$—CaO/$O_2$
$N_2$—$O_2$,Pt/$ZrO_2$—$Y_2O_3$/Pt, air
$O_2$Pt/$ZrO_2$—$Y_2O_3$/$Fe_{1-x}$/Pt,$N_2$ The process of the present invention can be operated at ambient or normal room temperatures when desired. In addition, if desired, the speed of separation can often be increased by raising the temperature at which the process is operated.

In addition, the time necessary to carry out the process of the present invention depends primarily upon the molecules to be separated and/or enriched or depleted, speed of movement through the solid electrolyte, and of course upon the particular electrolyte employed and the differences in electronegativity of the cathode and anode of the system. However, usually the process of the present invention can be completed within several minutes or up to several hours depending upon the desired degree of concentration change.

If desired, the speed of separation can be increased by applying a small potential across the anode and cathode of the system. Such potential when added is usually between about 1 and about 20 volts.

In addition, if desired, the present invention can be practiced by employing multiple steps whereby the various steps can be repeated to obtain the desired level of concentration. Moreover, it is possible to operate the process so that a series of structures can be arranged to avoid the step of removing the reaction products in each single stage and merely remove the product from the last stage. In such an arrangement the second electrode of the initial stage is electrically connected to a second electrolyte which in turn is connected to another electrode having an electronegativity different from that of the preselected molecule or atom and from the second electrode.

The desired products can be removed from the region of the first or second electrode by either physical means or chemical separation. In particular, such physical means would include scraping and melting, and chemical means would employ a chemical which would preferentially remove the desired material from the region of the first or second electrode without removing the solid electrolyte and/or the remaining electrode. Moreover, it may be desirable to remove the desired product from the electrolyte. In such instances, it is first preferable to remove the electrodes from the electrolyte such as by the means discussed above. Next the desired product is removed such as by dissolving the electrolyte in a suitable solvent which may not dissolve the desired product, or which might place the desired ion in solution where it could be separated by further chemical means such as precipitation, or by leaching the desired product out of the electrolyte.

When the process is for enrichment and the electrolyte preferentially conducts the preselected atom or molecule at a rate faster than that of the other atom(s) or molecule(s) present, the removal step would be from the region of the second electrode; whereas, if the process is for depletion with the same type of electrolyte, the removal step would be from the electrolyte or from the region of the first electrode when said electrode is in a form where the ions are higly mobile such as a gas or liquid. When the process is for enrichment and the electrolyte preferentially conducts the preselected atom or molecule at a rate slower than that of the other atom(s) or molecule(s) present, the removal step would be from the electrolyte or from the region of the first electrode when the first electrode is in a highly mobile form such as in gaseous or liquid form; whereas, if the process is for depletion with this latter type of electrolyte (e.g., preferentially slower rate) the removal step would be from the region of the second electrode.

What is claimed is:

1. A method for changing the concentration of a preselected atom or molecule in a mixture containing said atom or molecule and at least one other atom or molecule having mass different from said preselected atom or molecule which comprises:
   (A) providing a first electrode containing said mixture;
   (B) providing a solid electrolyte which preferentially conducts the preselected atom or molecule in ionic form at a rate different from that of the other molecules in ionic form in said mixture;
   (C) providing a second electrode of material having an electronegativity different from that of said preselected atom or molecule;
   (D) placing said first and second electrodes on opposite sides of said solid electrolyte in electrically conducting relationship therewith;
   (E) connecting said first and second electrodes with an electrical path to provide for the assembly of electrodes and solid electrolyte to pass current whereby said preselected atom or molecule moves in ionic form through said solid electrolyte in ionic form and concentrate at said second electrode;
   (F) terminating said current when the concentration of said preselected atom or molecule at said first or second electrode has reached a predetermined level different from its concentration in said mixture; and
   (G) removing from the region of said first or second electrode or said electrolyte, material having said preselected level of concentrate of said preselected molecule or atom.

2. The process of claim 1 wherein the electrolyte preferentially conducts said preselected molecule or atom in ionic form at a rate faster than that of the other atom(s) or molecule(s) in the mixture.

3. The process of claim 1 wherein the electrolyte preferentially conducts said preselected molecule or atom in ionic form at a rate slower than that of the other atom(s) or molecule(s) in the mixture.

4. The process of claim 1 which is for the enrichment of an isotope of an element from another isotope of the same element.

5. The process of claim 4 wherein said element is selected from the group consisting of alkali metal, alkaline earth metal, group VII, group IB, group II, group IV, group III, group VI, actinides and lanthanides.

6. The process of claim 1 wherein said electrolyte is selected from the group consisting of $\beta$-alumina and $\beta$-gallia.

7. The process of claim 6 wherein an isotope of a metal is selected from the group consisting of lithium, sodium, potassium, rubidium, cesium, europium, uranium, silver and manganese.

8. The process of claim 1 wherein an isotope of a metal is selected from the group consisting of lithium, sodium, potassium, rubidium, cesium, europium, uranium, silver, and manganese.

9. The process of claim 1 wherein said first electrode is sodium, said electrolyte is $Na_2O.11Al_2O_3$, and said second electrode is liquid sulfur.

10. The process of claim 1 wherein a lead isotope is enriched and the electrolyte is $PbO_2$.

11. The process of claim 1 wherein a fluoride isotope is enriched and the electrolyte is $PbF_2$.

12. Apparatus for changing the concentration of a preselected atom or molecule in a mixture containing said atom or molecule and atom(s) or molecule(s) having mass d different from said preselected atom or molecule comprising:
   (A) a first electrode of material containing said mixture in an amount greater than that used in a solid electrolyte battery and sufficient to permit changing the concentration of said preselected atom or molecule;

(B) a second electrode of a material having an electronegativity different from that of the preselected atom or molecule;

(C) a solid electrolyte which preferentially conducts the preselected atom or molecule in ionic form at a rate different from that of the other atoms or molecules in ionic form in said mixture and sufficiently large to provide for the preselected level of concentration of said preselected atom or molecule;

(D) said solid electrolyte being in electrical contact with and between said first and second electrodes; and (E) an electrical path interconnecting said first and second electrodes.

* * * * *